United States Patent
Manevich et al.

(10) Patent No.: US 12,524,038 B2
(45) Date of Patent: Jan. 13, 2026

(54) SCALABLE BOUNDARY CLOCK

(71) Applicant: MELLANOX TECHNOLOGIES, LTD., Yokneam (IL)

(72) Inventors: Natan Manevich, Ramat HaSharon (IL); Dotan David Levi, Kiryat Motzkin (IL); Wojciech Wasko, Młynek (PL); Ariel Almog, Kohav Yair (IL); Bar Shapira, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 191 days.

(21) Appl. No.: 17/867,779

(22) Filed: Jul. 19, 2022

(65) Prior Publication Data
US 2023/0367358 A1   Nov. 16, 2023

Related U.S. Application Data

(60) Provisional application No. 63/340,953, filed on May 12, 2022.

(51) Int. Cl.
*G06F 1/12* (2006.01)
*G06F 1/06* (2006.01)
*G06F 1/10* (2006.01)

(52) U.S. Cl.
CPC ............... *G06F 1/12* (2013.01); *G06F 1/06* (2013.01); *G06F 1/10* (2013.01)

(58) Field of Classification Search
None
See application file for complete search history.

(56) References Cited

U.S. PATENT DOCUMENTS

| | | | |
|---|---|---|---|
| 5,392,421 A | 2/1995 | Lennartsson |
| 5,402,394 A | 3/1995 | Turski |
| 5,416,808 A | 5/1995 | Witsaman et al. |
| 5,491,792 A | 2/1996 | Grisham et al. |
| 5,564,285 A | 10/1996 | Jurewicz et al. |

(Continued)

FOREIGN PATENT DOCUMENTS

| | | | |
|---|---|---|---|
| CN | 106817183 A | 6/2017 |
| CN | 108829493 A | 11/2018 |

(Continued)

OTHER PUBLICATIONS

Levi et al., U.S. Appl. No. 17/246,730, filed May 3, 2021.

(Continued)

*Primary Examiner* — Fahmida Rahman
(74) *Attorney, Agent, or Firm* — Meitar Patents Ltd.; Daniel Kligler (57) ABSTRACT

In one embodiment, a synchronized communication system includes a first network device and a second network device, wherein the first network device includes a first physical hardware clock, and is configured to recover a reference clock time from packets received from a remote clock, find a clock differential between a clock time output by the first physical hardware clock and the recovered reference clock time, provide a control signal to the second network device responsively to the clock differential, and the second network device includes a second physical hardware clock, and is configured to adjust a clock time output by the second physical hardware clock responsively to the control signal.

15 Claims, 8 Drawing Sheets

(56) References Cited

U.S. PATENT DOCUMENTS

| | | | |
|---|---|---|---|
| 5,592,486 | A | 1/1997 | Lo et al. |
| 5,896,524 | A | 4/1999 | Halstead, Jr. et al. |
| 6,055,246 | A | 4/2000 | Jones |
| 6,084,856 | A | 7/2000 | Simmons et al. |
| 6,144,714 | A | 11/2000 | Bleiweiss et al. |
| 6,199,169 | B1 | 3/2001 | Voth |
| 6,289,023 | B1 | 9/2001 | Dowling et al. |
| 6,449,291 | B1 | 9/2002 | Burns et al. |
| 6,535,926 | B1 | 3/2003 | Esker |
| 6,556,636 | B1 | 4/2003 | Takagi |
| 6,556,638 | B1 | 4/2003 | Blackburn |
| 6,718,476 | B1 | 4/2004 | Shima |
| 6,918,049 | B2 | 7/2005 | Lamb et al. |
| 7,111,184 | B2 | 9/2006 | Thomas, Jr. et al. |
| 7,191,354 | B2 | 3/2007 | Purho |
| 7,245,627 | B2 | 7/2007 | Goldenberg et al. |
| 7,254,646 | B2 | 8/2007 | Aguilera et al. |
| 7,334,124 | B2 | 2/2008 | Pham et al. |
| 7,412,475 | B1 | 8/2008 | Govindarajalu |
| 7,440,474 | B1 | 10/2008 | Goldman et al. |
| 7,447,975 | B2 | 11/2008 | Riley |
| 7,483,448 | B2 | 1/2009 | Bhandari et al. |
| 7,496,686 | B2 | 2/2009 | Coyle |
| 7,535,933 | B2 | 5/2009 | Zerbe et al. |
| 7,623,552 | B2 | 11/2009 | Jordan et al. |
| 7,636,767 | B2 | 12/2009 | Lev-Ran et al. |
| 7,650,158 | B2 | 1/2010 | Indirabhai |
| 7,656,751 | B2 | 2/2010 | Rischar et al. |
| 7,750,685 | B1 | 7/2010 | Bunch et al. |
| 7,904,713 | B1 | 3/2011 | Zajkowski et al. |
| 7,941,684 | B2 | 5/2011 | Serebrin et al. |
| 8,065,052 | B2 | 11/2011 | Fredriksson et al. |
| 8,300,749 | B2 | 10/2012 | Hadzic et al. |
| 8,341,454 | B1 | 12/2012 | Kondapalli |
| 8,370,675 | B2 | 2/2013 | Kagan |
| 8,407,478 | B2 | 3/2013 | Kagan et al. |
| 8,607,086 | B2 | 12/2013 | Cullimore |
| 8,699,406 | B1 | 4/2014 | Charles et al. |
| 8,824,903 | B2 | 9/2014 | Christensen |
| 8,879,552 | B2 | 11/2014 | Zheng |
| 8,930,647 | B1 | 1/2015 | Smith |
| 9,344,265 | B2 | 5/2016 | Karnes |
| 9,397,960 | B2 | 7/2016 | Arad et al. |
| 9,549,234 | B1 | 1/2017 | Mascitto |
| 9,753,854 | B1 | 9/2017 | Bao |
| 9,942,025 | B2 | 4/2018 | Bosch et al. |
| 9,979,998 | B1 | 5/2018 | Pogue et al. |
| 10,014,937 | B1 | 7/2018 | Di Mola et al. |
| 10,027,601 | B2 | 7/2018 | Narkis et al. |
| 10,054,977 | B2 | 8/2018 | Mikhaylov et al. |
| 10,095,543 | B1 | 10/2018 | Griffin et al. |
| 10,148,258 | B2 | 12/2018 | Carlson et al. |
| 10,164,759 | B1 | 12/2018 | Volpe |
| 10,320,646 | B2 | 6/2019 | Mirsky et al. |
| 10,515,045 | B1 | 12/2019 | Mattina |
| 10,623,173 | B1 | 4/2020 | Geng et al. |
| 10,637,776 | B2 | 4/2020 | Iwasaki |
| 10,727,966 | B1 | 7/2020 | Izenberg et al. |
| 10,778,361 | B1 | 9/2020 | Almog et al. |
| 10,841,243 | B2 | 11/2020 | Levi et al. |
| 10,879,910 | B1 | 12/2020 | Franck et al. |
| 10,887,077 | B1 | 1/2021 | Ivry |
| 11,070,224 | B1 | 7/2021 | Faig et al. |
| 11,070,304 | B1 | 7/2021 | Levi et al. |
| 11,128,500 | B1 | 9/2021 | Mentovich et al. |
| 11,157,433 | B2 | 10/2021 | Lederman et al. |
| 11,240,079 | B1 | 2/2022 | Kushnir et al. |
| 11,303,363 | B1 | 4/2022 | Mohr et al. |
| 11,336,383 | B2 | 5/2022 | Mula et al. |
| 11,368,768 | B2 | 6/2022 | Bakopoulos et al. |
| 11,379,334 | B1 | 7/2022 | Srinivasan et al. |
| 11,388,263 | B2 | 7/2022 | Levi et al. |
| 11,476,928 | B2 | 10/2022 | Levi et al. |
| 2001/0006500 | A1 | 7/2001 | Nakajima et al. |
| 2002/0027886 | A1 | 3/2002 | Fischer et al. |
| 2002/0031199 | A1 | 3/2002 | Rolston et al. |
| 2004/0096013 | A1 | 5/2004 | Aturell et al. |
| 2004/0153907 | A1 | 8/2004 | Gibart |
| 2005/0033947 | A1 | 2/2005 | Morris et al. |
| 2005/0172181 | A1 | 8/2005 | Huliehel |
| 2005/0268183 | A1 | 12/2005 | Barmettler |
| 2006/0109376 | A1 | 5/2006 | Chaffee et al. |
| 2007/0008044 | A1 | 1/2007 | Shimamoto |
| 2007/0072451 | A1 | 3/2007 | Tazawa et al. |
| 2007/0104098 | A1 | 5/2007 | Kimura et al. |
| 2007/0124415 | A1 | 5/2007 | Ev-Ran et al. |
| 2007/0139085 | A1 | 6/2007 | Elliot et al. |
| 2007/0159924 | A1 | 7/2007 | Vook et al. |
| 2007/0266119 | A1 | 11/2007 | Ohly |
| 2008/0069150 | A1 | 3/2008 | Badt et al. |
| 2008/0225841 | A1 | 9/2008 | Conway et al. |
| 2008/0285597 | A1 | 11/2008 | Downey et al. |
| 2009/0055676 | A1 | 2/2009 | Wiebe |
| 2009/0257458 | A1 | 10/2009 | Cui et al. |
| 2010/0280858 | A1 | 11/2010 | Bugenhagen |
| 2011/0182191 | A1 | 7/2011 | Jackson |
| 2011/0194425 | A1 | 8/2011 | Li et al. |
| 2012/0063556 | A1 | 3/2012 | Hoang |
| 2012/0076319 | A1 | 3/2012 | Terwal |
| 2012/0301134 | A1 | 11/2012 | Davari et al. |
| 2013/0039359 | A1 | 2/2013 | Bedrosian |
| 2013/0045014 | A1 | 2/2013 | Mottahedin et al. |
| 2013/0215889 | A1 | 8/2013 | Zheng et al. |
| 2013/0235889 | A1 | 9/2013 | Aweya et al. |
| 2013/0294144 | A1 | 11/2013 | Wang et al. |
| 2013/0315265 | A1 | 11/2013 | Webb, III et al. |
| 2013/0336435 | A1 | 12/2013 | Akkihal et al. |
| 2014/0085141 | A1 | 3/2014 | Geva et al. |
| 2014/0153680 | A1 | 6/2014 | Garg et al. |
| 2014/0185216 | A1 | 7/2014 | Zeng et al. |
| 2014/0185632 | A1 | 7/2014 | Steiner et al. |
| 2014/0253387 | A1 | 9/2014 | Gunn et al. |
| 2014/0281036 | A1 | 9/2014 | Cutler et al. |
| 2014/0301221 | A1 | 10/2014 | Nadeau et al. |
| 2014/0321285 | A1 | 10/2014 | Chew et al. |
| 2015/0019839 | A1 | 1/2015 | Cardinell et al. |
| 2015/0078405 | A1 | 3/2015 | Roberts |
| 2015/0092793 | A1 | 4/2015 | Aweya |
| 2015/0127978 | A1 | 5/2015 | Cui et al. |
| 2015/0163050 | A1 | 6/2015 | Han et al. |
| 2015/0318941 | A1 | 11/2015 | Zheng et al. |
| 2016/0057518 | A1 | 2/2016 | Neudorf |
| 2016/0072602 | A1 | 3/2016 | Earl et al. |
| 2016/0078901 | A1 | 3/2016 | Toma et al. |
| 2016/0110211 | A1 | 4/2016 | Karnes |
| 2016/0140066 | A1 | 5/2016 | Worrell et al. |
| 2016/0277138 | A1 | 9/2016 | Garg et al. |
| 2016/0285574 | A1 | 9/2016 | White et al. |
| 2016/0315756 | A1 | 10/2016 | Tenea et al. |
| 2017/0005903 | A1 | 1/2017 | Mirsky |
| 2017/0017604 | A1 | 1/2017 | Chen et al. |
| 2017/0126589 | A1 | 5/2017 | Estabrooks et al. |
| 2017/0160933 | A1 | 6/2017 | De Jong et al. |
| 2017/0214516 | A1 | 7/2017 | Rivaud et al. |
| 2017/0302392 | A1 | 10/2017 | Farra et al. |
| 2017/0331926 | A1 | 11/2017 | Raveh et al. |
| 2017/0359137 | A1 | 12/2017 | Butterworth et al. |
| 2018/0059167 | A1 | 3/2018 | Sharf et al. |
| 2018/0152286 | A1 | 5/2018 | Kemparaj et al. |
| 2018/0188698 | A1 | 7/2018 | Dionne et al. |
| 2018/0191802 | A1 | 7/2018 | Yang et al. |
| 2018/0227067 | A1 | 8/2018 | Hu et al. |
| 2018/0309654 | A1 | 10/2018 | Achkir et al. |
| 2019/0007189 | A1 | 1/2019 | Hossain et al. |
| 2019/0014526 | A1 | 1/2019 | Bader et al. |
| 2019/0089615 | A1 | 3/2019 | Branscomb et al. |
| 2019/0149258 | A1 | 5/2019 | Araki et al. |
| 2019/0158909 | A1 | 5/2019 | Kulkarni et al. |
| 2019/0196563 | A1 | 6/2019 | Lai |
| 2019/0273571 | A1 | 9/2019 | Bordogna et al. |
| 2019/0319729 | A1 | 10/2019 | Leong et al. |
| 2019/0349392 | A1 | 11/2019 | Wetterwald et al. |
| 2019/0379714 | A1 | 12/2019 | Levi et al. |
| 2020/0162234 | A1 | 5/2020 | Almog et al. |

(56) References Cited

U.S. PATENT DOCUMENTS

| | | | |
|---|---|---|---|
| 2020/0169379 A1 | 5/2020 | Gaist et al. | |
| 2020/0235905 A1 | 7/2020 | Su et al. | |
| 2020/0304224 A1 | 9/2020 | Neugeboren | |
| 2020/0331480 A1 | 10/2020 | Zhang et al. | |
| 2020/0344333 A1 | 10/2020 | Hawari et al. | |
| 2020/0396050 A1 | 12/2020 | Perras et al. | |
| 2020/0401434 A1 | 12/2020 | Thampi et al. | |
| 2020/0403652 A1 | 12/2020 | Goff et al. | |
| 2021/0006344 A1* | 1/2021 | Chen | G01S 19/14 |
| 2021/0141413 A1 | 5/2021 | Levi et al. | |
| 2021/0218431 A1 | 7/2021 | Narayanan et al. | |
| 2021/0243140 A1 | 8/2021 | Evi et al. | |
| 2021/0288785 A1 | 9/2021 | Faig et al. | |
| 2021/0297151 A1 | 9/2021 | Levi et al. | |
| 2021/0297230 A1 | 9/2021 | Dror et al. | |
| 2021/0318978 A1 | 10/2021 | Hsung | |
| 2021/0328900 A1 | 10/2021 | Sattinger et al. | |
| 2021/0392065 A1 | 12/2021 | Sela et al. | |
| 2021/0409031 A1 | 12/2021 | Ranganathan et al. | |
| 2022/0006606 A1 | 1/2022 | Levi et al. | |
| 2022/0021393 A1 | 1/2022 | Ravid et al. | |
| 2022/0066978 A1 | 3/2022 | Mishra et al. | |
| 2022/0086105 A1 | 3/2022 | Evi et al. | |
| 2022/0121691 A1 | 4/2022 | Barathi | |
| 2022/0173741 A1 | 6/2022 | Ravid et al. | |
| 2022/0191275 A1 | 6/2022 | Levi et al. | |
| 2022/0191578 A1* | 6/2022 | Ramkumar | G02B 27/0176 |
| 2022/0224500 A1 | 7/2022 | Mula et al. | |
| 2022/0239549 A1 | 7/2022 | Zhao et al. | |
| 2022/0303034 A1* | 9/2022 | Lesi | H04J 3/14 |
| 2022/0342086 A1 | 10/2022 | Yoshida | |
| 2022/0390979 A1* | 12/2022 | Xu | G06F 1/12 |

FOREIGN PATENT DOCUMENTS

| | | |
|---|---|---|
| EP | 1215559 B1 | 9/2007 |
| EP | 2770678 A1 | 8/2014 |
| JP | 2011091676 A | 5/2011 |
| TW | 498259 B | 8/2002 |
| WO | 2012007276 A1 | 1/2012 |
| WO | 2013124782 A2 | 8/2013 |
| WO | 2013143112 A1 | 10/2013 |
| WO | 2014029533 A1 | 2/2014 |
| WO | 2014138936 A1 | 9/2014 |

OTHER PUBLICATIONS

Levi et al., U.S. Appl. No. 17/315,396, filed May 10, 2021.
Levi et al., U.S. Appl. No. U.S. Appl. No. 17/359,667, filed Jun. 28, 2021.
Wasko et al., U.S. Appl. No. 17/520,674, filed Nov. 7, 2021.
Wasko et al., U.S. Appl. No. 17/582,058, filed Jan. 24, 2022.
Levi et al., U.S. Appl. No. 17/667,600, filed Feb. 9, 2022.
Shapira et al., U.S. Appl. No. 17/534,776, filed Nov. 24, 2021.
Shapira et al., U.S. Appl. No. 17/578,115, filed Jan. 18, 2022.
Kernen et al., U.S. Appl. No. 17/858,236, filed Jul. 6, 2022.
Zhang et al., "TI BAW technology enables ultra-low jitter clocks for highspeed networks", White paper, Texas Instruments, pp. 1-11, Feb. 2019.
Skywork Solutions Inc., "PCI Express 3.1 JITTER Requirements", AN562, pp. 1-16, year 2021.
Intel, "Can Altera GX/GT/GZ device high speed transceivers handle Spread Spectrum Clocking (SSC), as required by PCIe or SATA/SAS protocols?", p. 1, Sep. 11, 2012.
Pismenny et al., U.S. Appl. No. 17/824,954, filed May 26, 2022.
U.S. Appl. No. 17/191,736 Advisory Action dated Feb. 16, 2023.
"IEEE Standard for Local and Metropolitan Area Networks—Timing and Synchronization for Time-Sensitive Applications," IEEE Std 802.1AS-2020, IEEE Computer Society, pp. 1-421, year 2020.
U.S. Appl. No. 17/549,949 Office Action dated Mar. 30, 2023.
Corbett et al., "Spanner: Google's Globally Distributed Database," ACM Transactions on Computer Systems, vol. 31, No. 3, article 8, pp. 1-22, Aug. 2013.
U.S. Appl. No. 17/191,736 Office Action dated Jun. 26, 2023.
IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
Weibel et al., "Implementation and Performance of Time Stamping Techniques", 2004 Conference on IEEE 1588, pp. 1-29, Sep. 28, 2004.
Working Draft Project American National Standard T10/1799-D, "Information Technology—SCSI Block Commands—3 (SBC-3)", pp. 1-220, Revision 19, May 29, 2009.
"Infiniband Architecture: Specification vol. 1", pp. 1-1727, Release 1.2.1, Infiniband Trade Association, Nov. 2007.
Mellanox Technologies, "Mellanox ConnectX IB: Dual-Port InfiniBand Adapter Cards with PCI Express 2.0", pp. 1-2, USA, year 2008.
Wikipedia—"Precision Time Protocol", pp. 1-8, Aug. 24, 2019.
IEEE Std 1588-2002, "IEEE Standard for a Precision Clock Synchronization Protocol for Networked Measurement and Control Systems", IEEE Instrumentation and Measurement Society, pp. 1-154, Nov. 8, 2002.
Weibel, H., "High Precision Clock Synchronization according to IEEE 1588 Implementation and Performance Issues", Zurich University of Applied Sciences, pp. 1-9, Jan. 17, 2005.
Lu et al., "A Fast CRC Update Implementation", Computer Engineering Laboratory, Electrical Engineering Department, pp. 113-120, Oct. 8, 2003.
Texas Instruments, "LMK05318 Ultra-Low Jitter Network Synchronizer Clock With Two Frequency Domains," Product Folder, pp. 1-86, Dec. 2018.
Dlugy-Hegwer et al., "Designing and Testing IEEE 1588 Timing Networks", Symmetricom, pp. 1-10, Jan. 2007.
Mellanox Technologies, "How to test 1PPS on Mellanox Adapters", pp. 1-6, Oct. 22, 2019 downloaded from https://community.mellanox.com/s/article/How-To-Test-1PPS-on-Mellanox-Adapters.
ITU-T recommendation, "G.8273.2/Y.1368.2—Timing characteristics of telecom boundary clocks and telecom time slave clocks", pp. 1-50, Jan. 2017.
Wasko et al., U.S. Appl. No. 17/549,949, filed Dec. 14, 2021.
IPClock, "IEEE 1588 Primer," ip-clock.com, pp. 1-3, May 1, 2017 (downloaded from https://web.archive.org/web/20170501192647/http://ip-clock.com/ieee-1588-primer/).
ITU-T Standard G.8261/Y.1361, "Timing and synchronization aspects in packet networks", pp. 1-120, Aug. 2019.
Levi et al., U.S. Appl. No. 17/313,026, filed May 6, 2021.
"Precision Time Protocol," PTP Clock Types, CISCO, pp. 1-52, Jul. 30, 2020, as downloaded from https://www.cisco.com/c/en/us/td/docs/dcn/aci/apic/5x/system-management-configuration/cisco-apic-system-management-configuration-guide-52x/m-precision-time-protocol.pdf.
ITU-T Standard G.8262/Y.1362, "Timing characteristics of synchronous equipment slave clock", pp. 1-44, Nov. 2018.
ITU-T Standard G.8264/Y.1364, "Distribution of timing information through packet networks", pp. 1-42, Aug. 2017.
Manevich et al., U.S. Appl. No. 17/579,630, filed Jan. 20, 2022.
Levi et al., U.S. Appl. No. 17/871,937, filed Jul. 24, 2022.
Levi et al., U.S. Appl. No. 17/868,841, filed Jul. 20, 2022.
Manevich et al., U.S. Appl. No. 17/885,604, filed Aug. 11, 2022.
U.S. Appl. No. 17/871,937 Office Action dated Aug. 1, 2023.
U.S. Appl. No. 17/578,115 Office Action dated Apr. 26, 2023.
U.S. Appl. No. 17/534,776 Office Action dated Jun. 29, 2023.
SiTime Corporation, "Sit5377—60 to 220 MHz, +100 ppb Elite RF™ Super-TCXO," Product Description, pp. 1-3, last updated Mar. 18, 2023 as downloaded from https://web.archive.org/web/20230318094421/https://www.sitime.com/products/super-tcxos/sit5377.
PCI-SIG, "PCI Express®—Base Specification—Revision 3.0," pp. 1-860, Nov. 10, 2010.
U.S. Appl. No. 17/885,604 Office Action dated Nov. 13, 2024.
U.S. Appl. No. 17/579,630 Office Action dated Oct. 24, 2022.
U.S. Appl. No. 17/579,630 Office Action dated Jan. 12, 2023.

(56) References Cited

OTHER PUBLICATIONS

U.S. Appl. No. 17/670,540 Office Action dated Jan. 18, 2023.
U.S. Appl. No. 17/191,736 Office Action dated Nov. 10, 2022.
Levi et al., U.S. Appl. No. 17/582,058, filed Jan. 24, 2022.

* cited by examiner

SCALABLE BOUNDARY CLOCK

RELATED APPLICATION INFORMATION

The present application claims benefit of U.S. Provisional Patent Application Ser. No. 63/340,953 of Manevich, et al., filed May 12, 2022, the disclosure of which is hereby incorporated herein by reference.

FIELD OF THE INVENTION

The present invention relates to computer systems, and in particular, but not exclusively to, clock synchronization.

BACKGROUND

Clock and frequency synchronization among network devices is used in many network applications. One application of using a synchronized clock value is for measuring latency between two devices. If the clocks are not synchronized the resulting latency measurement will be inaccurate.

Synchronous Ethernet (SyncE) is an International Telecommunication Union Telecommunication (ITU-T) Standardization Sector standard for computer networking that facilitates the transference of clock signals over the Ethernet physical layer. In particular, SyncE enables clock synchronization inside a network with respect to a master clock.

The actual clock value (e.g., in Coordinated Universal Time (UTC) format) is handled by higher layer standards and protocols, such as Precision Time Protocol (PTP). Precision Time Protocol (PTP) is a protocol used to synchronize clocks throughout a computer network, and is considered to be the de-facto standard for this purpose.

Time, clock and frequency synchronization is crucial in some modern computer network applications. It enables 5G and 6G networks, and is proven to enhance the performance of data center workloads.

SUMMARY

There is provided in accordance with an embodiment of the present disclosure, a synchronized communication system, including a first network device and a second network device, wherein the first network device includes a first physical hardware clock, and is configured to recover a reference clock time from packets received from a remote clock, find a clock differential between a clock time output by the first physical hardware clock and the recovered reference clock time, provide a control signal to the second network device responsively to the clock differential, and the second network device includes a second physical hardware clock, and is configured to adjust a clock time output by the second physical hardware clock responsively to the control signal.

Further in accordance with an embodiment of the present disclosure the second network device is configured to adjust a clock frequency of the second physical hardware clock responsively to the control signal.

Still further in accordance with an embodiment of the present disclosure the reference clock time is in Coordinated Universal Time (UTC) format.

Additionally in accordance with an embodiment of the present disclosure the first network device includes a network interface to receive packets over a network from the remote clock, which outputs the reference clock time.

Moreover, in accordance with an embodiment of the present disclosure the first network device is configured to recover the reference clock time from the packets Precision Time Protocol (PTP).

Further in accordance with an embodiment of the present disclosure the second network device includes a clock output port to output a clock signal indicative of the clock time output by the second physical hardware clock via at least one clock connection, and the first network device includes a clock input port to receive the clock signal via the at least one clock connection.

Still further in accordance with an embodiment of the present disclosure the clock signal is an analog signal, and the control signal is a digital signal.

Additionally in accordance with an embodiment of the present disclosure the second network device is configured to output the clock signal via the at least one clock connection using a pulsed signal.

Moreover, in accordance with an embodiment of the present disclosure the first network device is configured to discipline the first physical hardware clock responsively to the received clock signal.

Further in accordance with an embodiment of the present disclosure the second network device is configured to adjust the clock time output by the second physical hardware clock so as to iteratively reduce an absolute value of the clock differential between the clock time output by the first physical hardware clock and the recovered reference clock time.

Still further in accordance with an embodiment of the present disclosure the second network device is configured to adjust the clock frequency output by the second physical hardware clock so as to iteratively reduce an absolute value of the clock differential between the clock time output by the first physical hardware clock and the recovered reference clock time.

Additionally in accordance with an embodiment of the present disclosure the first network device includes at least one of the following a data processing unit (DPU), a central processing unit (CPU), a switch, and a network interface controller.

Moreover in accordance with an embodiment of the present disclosure, the system includes a third network device, and wherein the second network device includes a clock output port to output a clock signal indicative of the clock time output by the second physical hardware clock via a first clock connection and a second clock connection to the first network device and the third network device, respectively, the first network device includes a clock input port to receive the clock signal via the first clock connection, and the third network device includes a clock input port to receive the clock signal via the second clock connection.

Further in accordance with an embodiment of the present disclosure the first network device is configured to discipline the first physical hardware clock responsively to the received clock signal, the third network device includes a third physical hardware clock, and the third network device is configured to discipline the third physical hardware clock responsively to the received clock signal.

Still further in accordance with an embodiment of the present disclosure any one of the first network device, second network device, and third network device are configured to selectively connect to the remote clock and to recover the reference clock time from packets received from the remote clock.

Additionally in accordance with an embodiment of the present disclosure, the system includes a third network device, and wherein the second network device, the first network device, and the third network device are connected in a daisy chain formation, the second network device includes a clock output port to output a first clock signal indicative of the clock time output by the second physical hardware clock via a first clock connection to the first network device, the first network device includes a clock input port to receive the first clock signal via the first clock connection, the first network device is configured to discipline the first physical hardware clock responsively to the received first clock signal, the first network device includes a clock output port to output a second clock signal indicative of a clock time output by the first physical hardware clock via a second clock connection to the third network device, the third network device includes a clock input port to receive the second clock signal via the second clock connection, the third network device includes a third physical hardware clock, and the third network device is configured to discipline the third physical hardware clock responsively to the received second clock signal.

There is also provided in accordance with another embodiment of the present disclosure a synchronized communication method, including in a first network device recovering a reference clock time from packets received from a remote clock, finding a clock differential between a clock time output a first physical hardware clock of the first network device and the recovered reference clock time, and providing a control signal to a second network device responsively to the clock differential, and in the second network device, adjusting a clock time output by a second physical hardware clock of the second network device responsively to the control signal.

Moreover, in accordance with an embodiment of the present disclosure, the method includes adjusting a clock frequency of the second physical hardware clock responsively to the control signal.

Further in accordance with an embodiment of the present disclosure the recovering includes recovering the reference clock time from the packets Precision Time Protocol (PTP).

Still further in accordance with an embodiment of the present disclosure, the method includes the first network device disciplining the first physical hardware clock responsively to the received clock signal.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Clock synchronization between different networking domains remains a challenge in the networking industry due to continual demand for tighter clock synchronization. A PTP boundary clock is a PTP device with 2 or more ports. The boundary block is a slave to an external master on one of its ports, and a master on another one of its ports, from which it spreads the clock in a network. Therefore, PTP enables a device to synchronize its PTP hardware clock (PHC) to an accurate master clock connected to one of the ports of the device. However, for a given number of devices on the same server, not all the devices may be connected to an accurate PTP master and may therefore be unable to synchronize its PHC to an accurate master clock.

One solution is for other devices, which are not connected to an accurate PTP master, to synchronize to a device, which is connected to an accurate PTP master through the operating system of the server. However, this process may introduce synchronization noise, typically a magnitude less accurate than the original accuracy achieved by the PTP protocol.

Embodiments of the present invention solve at least some of the above problems by providing a scalable boundary clock including discrete PTP network devices. Any one of the network devices may be designated as a local reference clock for the other network devices and recover a reference clock time from a remote clock and distribute the reference clock time to the other network devices. The network devices are connected via their clock output and input ports (e.g., pulse-per-second (PPS) interfaces) using clock connections so that a root network device is able to distribute the reference clock time recovered by the "local reference clock" network device to the other network devices via the clock connections. In some embodiments, the root network device is connected directly to each of the other network devices in a one-to-many formation. In some embodiments, the root network device is connected to the other network devices in a daisy chain formation so that the reference clock time is distributed to one of the network devices, and then from that network device to another one of the network devices, and so on. In some embodiments, the root network device is connected to the other network devices using a combination of daisy chain and one-to-many connections.

The "local reference clock" network device finds a clock differential between a clock time of its physical hardware clock and the recovered reference clock time. The "local reference clock" network device provides a control signal to the root network device based on the clock differential. The root network device disciplines its physical hardware clock (adjusting clock time and/or clock frequency) based on the control signal. The root network device then outputs a clock signal indicative of the clock time (and/or clock frequency) of its physical hardware clock to its clock output port to one or more of the network devices depending on the configuration of the clock connections between the root network device and the other network devices. The network device(s) receiving the clock signal disciplines its physical hardware clock based on the clock signal and outputs a clock signal indicative of the clock time (and/or clock frequency) of its physical hardware clock to its clock output port to one or more of the network devices depending on the configuration of the clock connections between this network device and the other network devices, and so on. In the above manner all the network devices are synchronized to the reference clock time.

System Description

Figure 1:
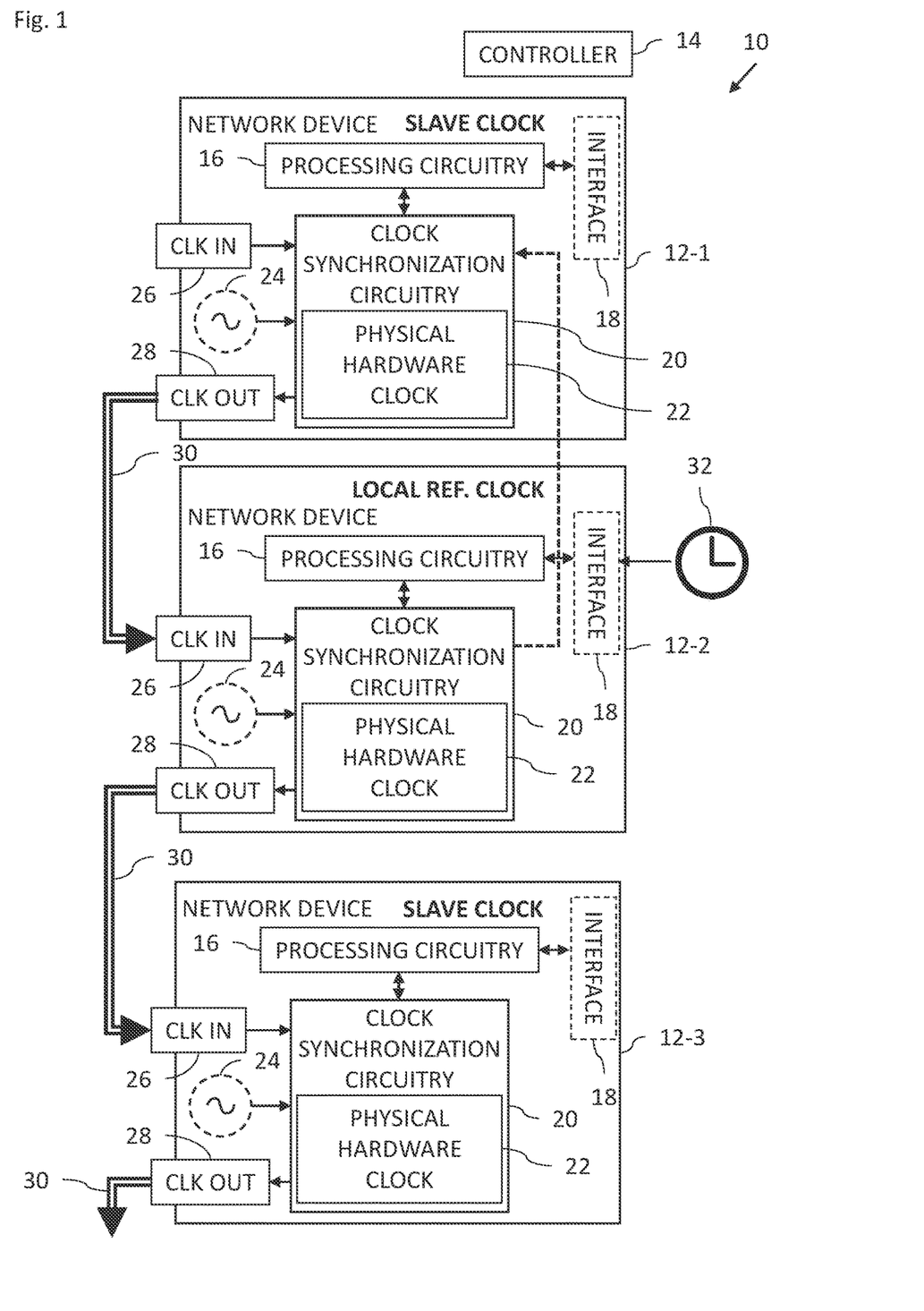
FIG. 1 is a block diagram view of a scalable boundary clock system constructed and operative in accordance with an embodiment of the present invention.

Reference is now made to FIG. 1, which is a block diagram view of a scalable boundary clock system 10 constructed and operative in accordance with an embodiment of the present invention.

The system 10 includes a plurality of network devices 12 (labeled network devices 12-1, 12-2, 12-3), and a controller 14. Each network device 12 may include processing circuitry 16, a network interface 18, clock synchronization circuitry 20, a physical hardware clock 22, an oscillator 24, a clock input port 26, and a clock output port 28.

A plurality of clock connections 30 are configured to connect the network devices 12 in a daisy chain formation. For example, network device 12-1 is connected to network device 12-2, which is connected to network device 12-3, which in turn may be connected to another network device (not shown), and so on. In the example of FIG. 1, the clock output port 28 of network device 12-1 is connected to the clock input port 26 of network device 12-2 via a first clock connection 30, and the clock output port 28 of network device 12-2 is connected to the clock input port 26 of network device 12-3 via a second clock connection 30, and so on. Any suitable tree topology can be implemented to connect the network devices 12 of the scalable boundary clock system 10 together, as described in more detail with reference to FIGS. 6 and 9. The network devices 12 may be connected as "one to many", "one to one", or any suitable combination thereof. The root of the tree may be considered to be the "root network device 12" or "the PPS synchronization master".

The system 10 may include more than (or less than) three network devices 12 connected together. The network devices 12 may be disposed on the same printed circuit board (not shown) with the clock connections 30 being implemented using printed circuit board (PCB) traces (not shown) on the circuit board between the network devices 12.

The processing circuitry 16 and the clock synchronization circuitry 20 may include hardwired processing circuitry and/or one or more processors on which to execute software. The software may be downloaded to the network device 12 or disposed on the network device 12 at manufacture. The processing circuitry 16 may include packet processing circuitry which may include a physical layer (PHY) chip and MAC chip (not shown). The processing circuitry may include switching circuitry, and/or graphics processing unit (GPU) or any 25 suitable processor, described in more detail with reference to FIG. 10. The network device 12 may include a data processing unit (DPU) or SmartNIC.

In some embodiments, the network interface 18 is configured to receive packets over a network from a remote clock 32, which outputs a reference clock time. In some embodiments, any one of the network devices 12 is configured to recover the reference clock time from the packets according to the Precision Time Protocol (PTP). In some embodiments, the network interface 18 is configured to transmit and receive clock synchronization messages over at least one network link (e.g., from the remote clock 32), and the clock synchronization circuitry 20 is configured to process the clock synchronization messages so as to recover a remote clock time from the remote clock 32. The clock synchronization messages may be received via any suitable interface via any suitable communication method and/or protocol.

The physical hardware clock 22 may be implemented as any suitable hardware clock, for example, a PTP hardware clock. The physical hardware clock 22 may be implemented as a physical clock, which is stored on the device 12. In some embodiments, the physical hardware clock 22 may be implemented as a hybrid hardware and software clock in which hardware stores a free running clock (e.g., a hardware counter which is incremented), and software holds parameters which convert the hardware clock into the actual clock time. In some embodiments, when the physical hardware clock 22 is implemented as a hybrid hardware and software clock, the PTP or PHC time and frequency adjustments do not affect the physical free running clock, but only the conversion parameters. The reference clock time may be maintained in any suitable format, for example, in Coordinated Universal Time (UTC) format.

Figure 2:
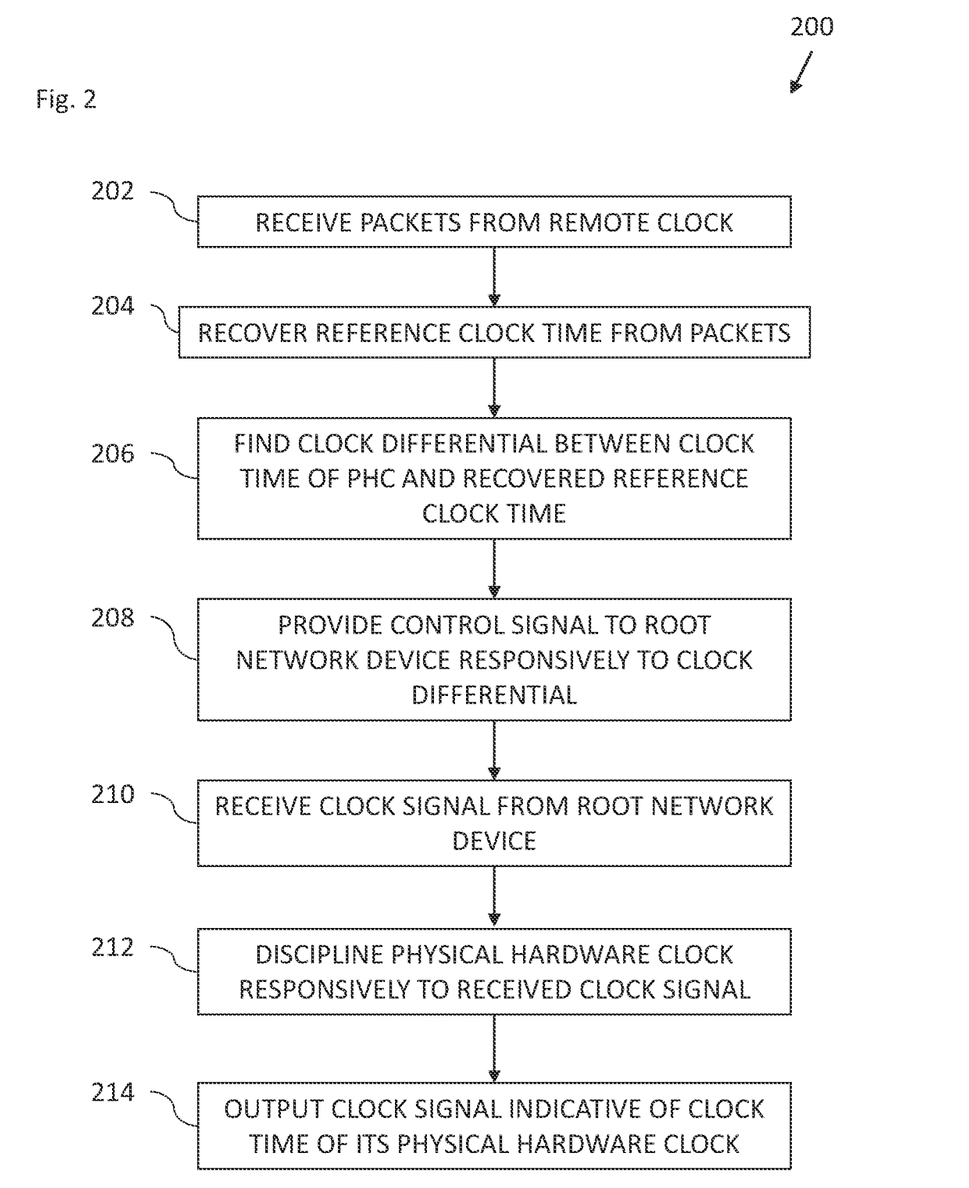
FIG. 2 is a flowchart including steps in a method of operation of a network device in the system of FIG. 1.

Reference is now made to FIG. 2, which is a flowchart 200 including steps in a method of operation of a network device in the system of FIG. 1. Reference is also made to FIG. 1.

In the example of FIG. 1, The network device 12-2 is designated as the local reference clock, for example by the controller 14. The network device 12-2 is configured to receive packets from the remote clock 32 (block 202). The network device 12-2 is configured to recover the reference clock time from packets received from the remote clock 32 (block 204). In some embodiments, the network device 12-2 is configured to recover the reference clock time from the packets according to Precision Time Protocol (PTP). In some embodiments, the reference clock time is in Coordinated Universal Time (UTC) format. The network device 12-2 is configured to find a clock differential between a clock time output by its physical hardware clock 22 and the recovered reference clock time (block 206). The network device 12-2 is configured to provide a control signal to the root network device 12-1 responsively to the clock differential (block 208). The control signal is typically sent to the network device 12-2 via a system software interface of the system 10. In some embodiments, the control signal may be sent using an out-of-band communication mechanism, e.g., using I2C to exchange the control signal. The out-of-band communication mechanism may be applicable to appliances which host multiple networking chips on one board, e.g., a mezzanine board with multiple chips. The control signal provides instructions to the network device 12-1 how to adjust the physical hardware clock 22 of the network device 12-1. The steps of blocks 202-208 may be performed by the clock synchronization circuitry 20 of the network device 12-2. In some embodiments, the clock synchronization circuitry 20 runs an instance of a PTP slave application (e.g., ptp4l slave) which performs one or more of the steps 202-208.

Figure 3:
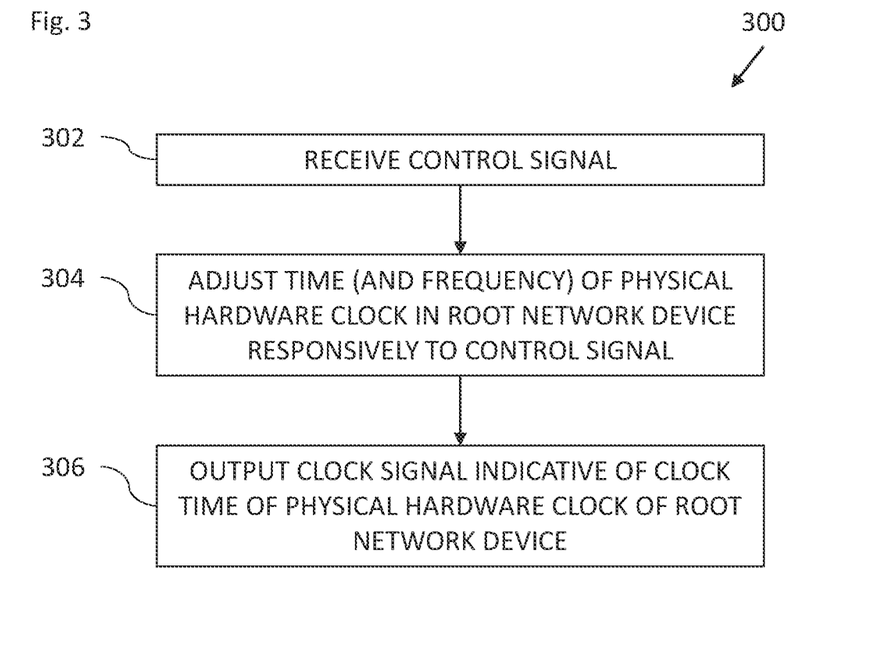
FIG. 3 is a flowchart including steps in a method of operation of a root network device in the system of FIG. 1.

Reference is now made to FIG. 3, which is a flowchart 300 including steps in a method of operation of the root network device 12-1 in the system 10 of FIG. 1. Reference is also made to FIG. 1.

The clock synchronization circuitry 20 of the network device 12-1 is configured to receive the control signal from the network device 12-2 (block 302). The clock synchronization circuitry 20 of the network device 12-1 is configured to adjust a clock time output by its physical hardware clock 22 (and/or a clock frequency of its physical hardware clock 22) responsively to the received control signal (block 304).

In some embodiments, the clock synchronization circuitry 20 of the network device 12-1 is configured to adjust the clock time output by its physical hardware clock 22 so as to iteratively reduce an absolute value of the clock differential between the clock time output by the physical hardware clock 22 of network device 12-2 and the recovered reference clock time, as described in more detail below with reference to FIG. 2. The clock time of any of the physical hardware clocks 22 may be adjusted by adjusting the clock frequency. In some embodiments, the clock synchronization circuitry 20 of the network device 12-1 is configured to adjust the clock frequency of its physical hardware clock 22 so as to iteratively reduce an absolute value of the clock differential between the clock time output by the physical hardware clock 22 of network device 12-2 and the recovered reference clock time. The clock synchronization circuitry 20 of the network device 12-2 is configured to generate a clock signal indicative of the clock time (and/or frequency) output by its physical hardware clock 22. In some embodiments a ptp4l master application generates the clock signal for sending via the clock output port 28 of the network device 12-1. The clock output port 28 of the network device 12-1 is configured to output the clock signal indicative of the clock time (and/or frequency) output by its physical hardware clock 22 via one of the clock connections 30 to the clock input port 26 of the network device 12-2 (block 306).

In some embodiments, the network devices 12 are configured to output the clock signals via the respective clock connections 30 in the form of any suitable signal e.g., using a pulsed signal such as N pulses per second, such as one pulse per second (PPS) signal(s) or 10 mega Hertz (10 MHz) signal(s). In some embodiments, the clock signals output via the clock connections 30 are analog signals while the control signal is a digital signal.

Reference is again made to FIGS. 1 and 2.

The clock input port 26 of the network device 12-2 is configured to receive the clock signal via one of the clock connections 30 (block 210). The clock synchronization circuitry 20 of the network device 12-2 is configured to discipline its physical hardware clock 22 responsively to the received clock signal (block 212). In some embodiments, a ts2phc application running on the clock synchronization circuitry 20 synchronizes the physical hardware clock 22 of the network devices 12-2 to the received clock signal. When the clock signal is received, the current time of the physical hardware clock 22 is sampled by the clock synchronization circuitry 20, which provides the current time and time indicated in the received clock signal to the ts2phc application, which synchronizes the physical hardware clock 22 to the time indicated in the received clock signal by instructing the physical hardware clock 22 to run faster or slower.

The clock synchronization circuitry 20 of the network device 12-2 is configured to generate a clock signal indicative of the clock time output by (and/or frequency of) its physical hardware clock 22. The clock output port 28 of the network device 12-2 is configured to output the clock signal indicative of the clock time output by (and/or frequency of) its physical hardware clock 22 via one of the clock connections 30 to the clock input port 26 of the network device 12-3 (block 214).

Figure 4:
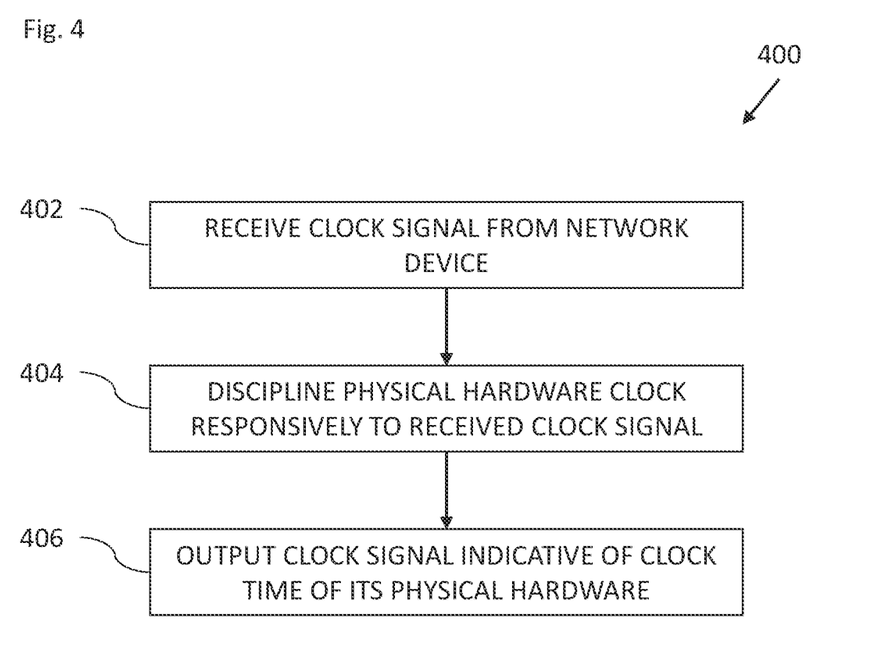
FIG. 4 is a flowchart including steps in a method of operation of another network device in the system of FIG. 1.

Reference is now made to FIG. 4, which is a flowchart 400 including steps in a method of operation of network device 12-3 in the system 10 of FIG. 1. Reference is also made to FIG. 1.

The clock input port 26 of network device 12-3 is configured to receive the clock signal (from network device 12-2) via the clock connection 30 (block 402). The clock synchronization circuitry 20 of the network device 12-3 is configured to discipline its physical hardware clock 22 responsively to the received clock signal (block 404). The clock synchronization circuitry 20 of the network device 12-3 is configured to generate a clock signal indicative of the clock time output by (and/or a frequency of) its physical hardware clock 22. The clock output port 28 of the network device 12-3 is configured to output the clock signal indicative of the clock time output by (and/or a frequency of) its physical hardware clock 22 via and one of the clock connections 30 to the clock input port 26 of another network device (not shown), and so on.

When the network devices 12 boot up, each network device 12 looks for a clock signal being received at its own clock input port 26 and if a clock signal is not found, the respective network device 12 uses a local clock, for example, based on an output of the oscillator 24 in that network device 12. When one of the network devices 12 detects a clock signal input at its clock input port 26, that network device 12 uses the received clock signal to discipline its physical hardware clock 22.

Figure 5:
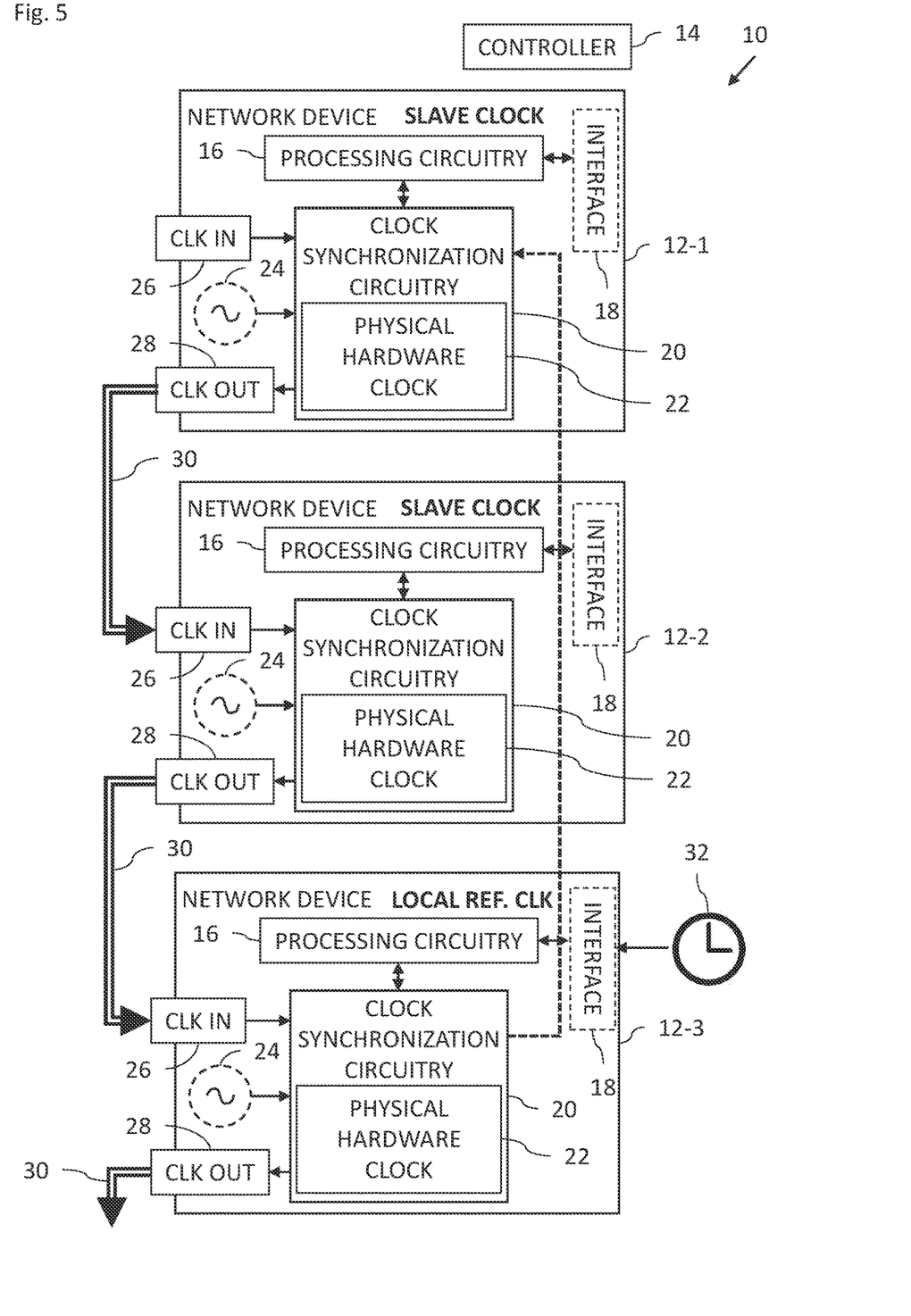
FIG. 5 is a block diagram view of the system of FIG. 1 showing a different network device assigned as the local reference clock.

Reference is now made to FIG. 5, which is a block diagram view of the system 10 of FIG. 1 showing a different network device assigned as the local reference clock. If the remote clock 32 goes down, and a new suitable master connected to network device 12-3 is discovered, the network device 12-3 is assigned by the controller 14 as the master network device in the system 10. The network device 12-3 recovers the reference clock time from the remote clock, finds the differential between the clock time of its physical hardware clock 22 and the recovered reference clock time, and provides a control signal to the root network device 12-1, from which the reference clock time is distributed via the clock connections 30 to the network devices 12-2, 12-3. Any port of any of the network devices 12 may serve as the PTP time source for the chain of network devices 12.

Therefore, any one of the network devices 12 may be configured to selectively connect to the remote clock 32 or another remote clock, and to recover the reference clock time from packets received from the remote clock 32 or other remote clock. In other words, any of the network devices 12 can be the local reference clock or one of the slave clocks.

Figure 6:
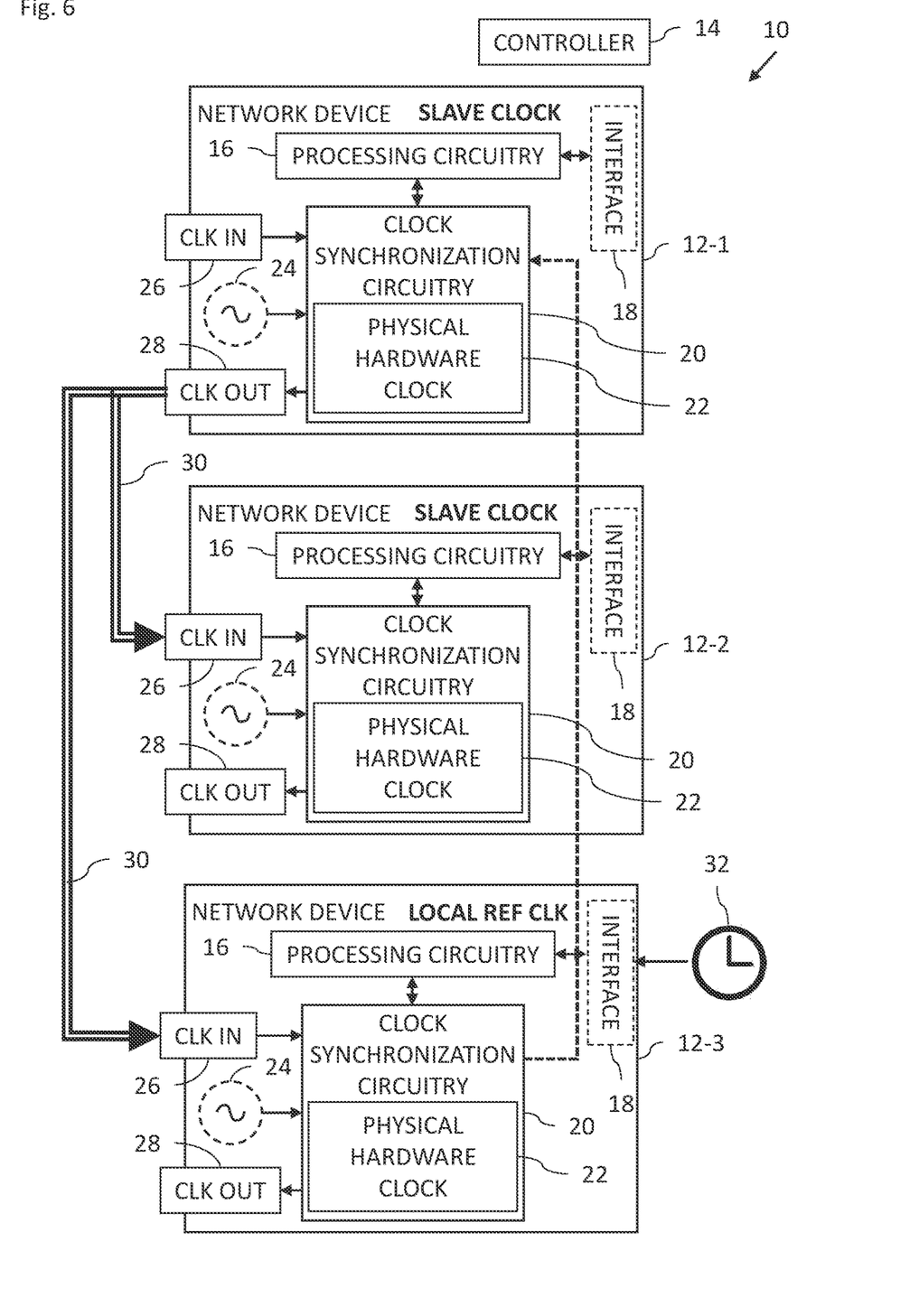
FIG. 6 is a block diagram view of the system of FIG. 1 with a first alternative clock connection arrangement.

Reference is now made to FIG. 6, which is a block diagram view of the system 10 of FIG. 1 with a first alternative clock connection arrangement. In FIG. 6 the clock output port 28 of the root network device 12-1 is directly connected by two clock connections 30 to the clock input ports 26 of the network devices 12-2, 12-3. The clock synchronization circuitry 20 generates the same clock signal for sending to both network devices 12-2, 12-3 via clock connections 30 to the clock input ports 26 of the network devices 12-2, 12-3.

Figure 7:
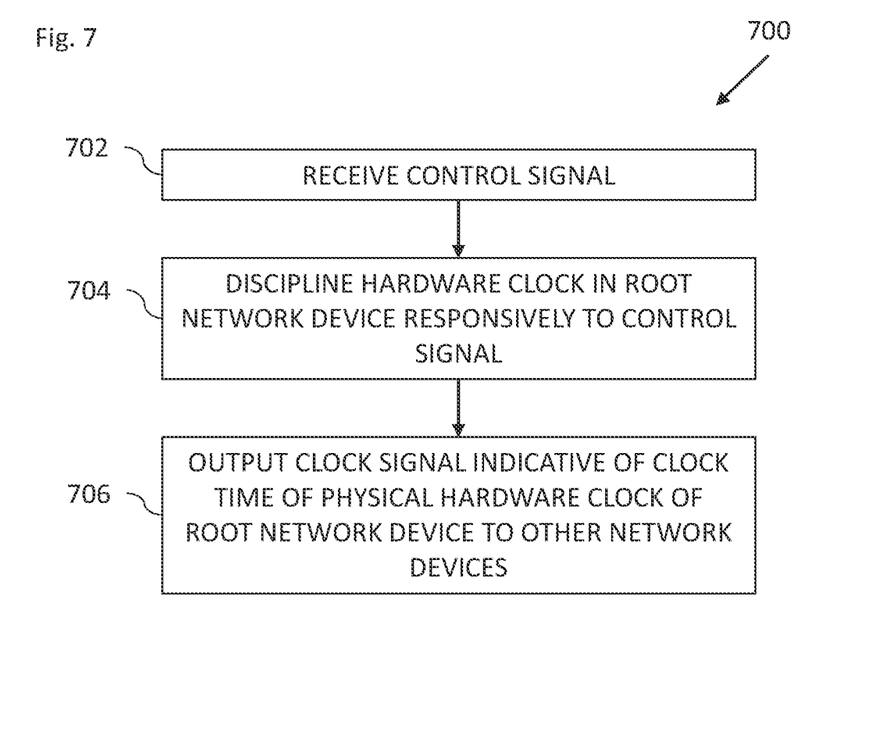
FIG. 7 is a flowchart including steps in a method of operation of a root network device in the arrangement of FIG. 6.

Reference is now made to FIG. 7, which is a flowchart 700 including steps in a method of operation of the root network device 12-1 in the arrangement of FIG. 6. Reference is also made to FIG. 6. The clock synchronization circuitry 20 of the network device 12-1 is configured to receive the control signal from the network device 12-3 (block 702), and discipline its physical hardware clock 22 responsively to the control signal (block 704). The clock output port 28 of the network device 12-1 is configured to output a clock signal indicative of the clock time output by its physical hardware clock 22 via the clock connections 30 to the network devices 12-2, 12-3 (block 706).

Figure 8:
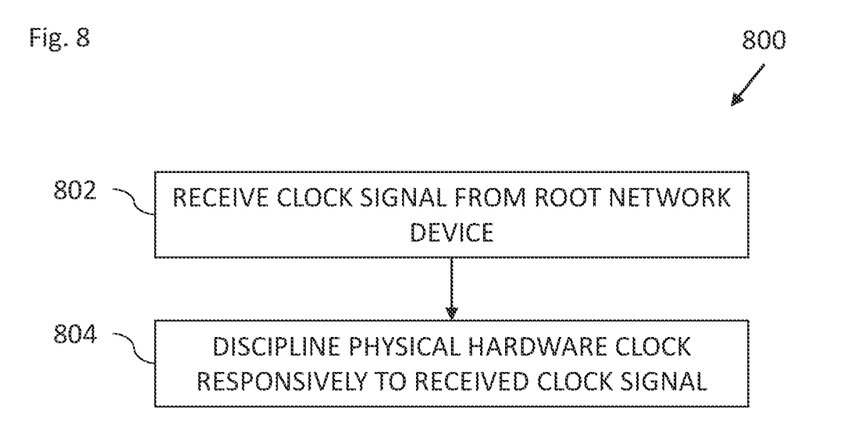
FIG. 8 is a flowchart including steps in a method of operation of a non-root network device in the arrangement of FIG. 6.

Reference is now made to FIG. 8, which is a flowchart 800 including steps in a method of operation of a non-root network device (e.g., network devices 12-2, 12-3) in the arrangement of FIG. 6. Reference is also made to FIG. 6. The non-root network device 12 is configured to receive the clock signal via its clock input port 26 from the root network device 12-1 (block 802), and discipline its physical hardware clock 22 responsively to the received clock signal (block 804).

Figure 9:
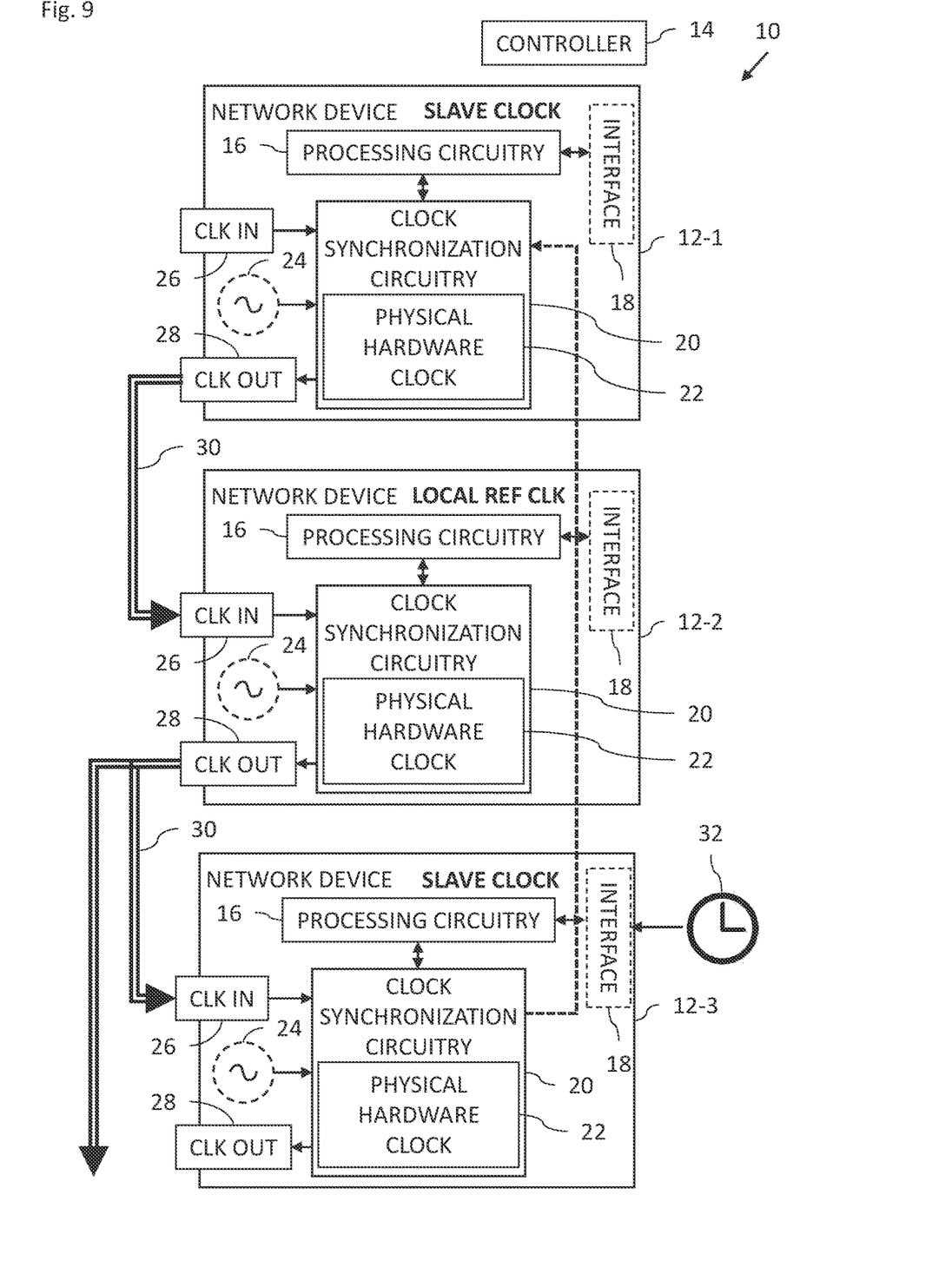
FIG. 9 is a block diagram view of the system of FIG. 1 with a second alternative clock connection arrangement.

Reference is now made to FIG. 9, which is a block diagram view of the system 10 of FIG. 1 with a second alternative clock connection arrangement. The arrangement of FIG. 9 shows one of the clock connections 30 connecting the clock output port 28 of network device 12-1 to the clock input port 26 of network device 12-2, and more clock connections 30 connecting the clock output port 28 of network device 12-2 to the clock input ports 26 of the network device 12-3 and another network device (not shown).

Figure 10:
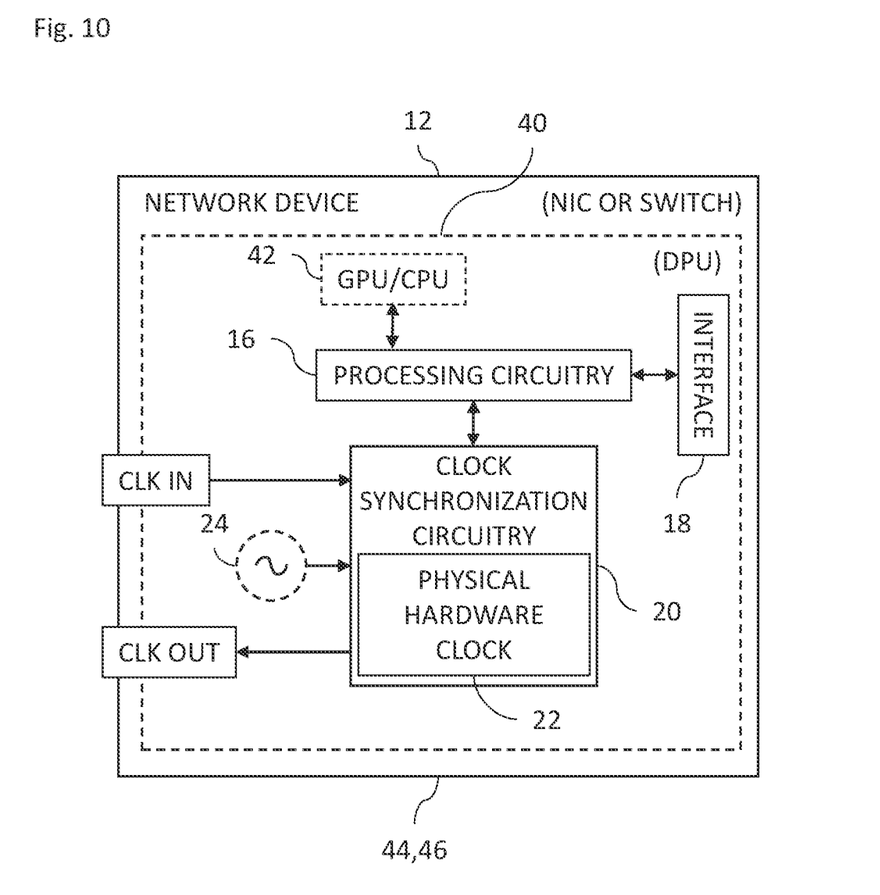
FIG. 10 is a block diagram view of a network device in the system of FIG. 1.

Reference is now made to FIG. 10, which is a block diagram view of one of the network devices 12 in the system 10 of FIG. 1. The network device 12 may include any one or more of the following: a data processing unit (DPU) 40 (DPU), a graphics processing unit (GPU) or central processing unit (CPU) 42, a switch 44, or a network interface controller (NIC) 46. The DPU 40 may include the processing circuitry 16 (e.g., one or more processing cores), the network interface 18, the clock synchronization circuitry 20, the physical hardware clock 22, and the oscillator 24.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A synchronized communication system, comprising:
   network devices including a root network device and a first network device; and
   at least one clock connection to connect the root network device to the first network device, wherein:
   the first network device includes a first physical hardware clock, and is configured to: recover a reference clock time from packets received from a remote clock; find a clock differential between a clock time output by the first physical hardware clock and the recovered reference clock time; and provide a control signal to the root network device responsively to the clock differential;
   the root network device includes a second physical hardware clock, and is configured to: adjust a clock time output by the second physical hardware clock yielding an adjusted clock time equal to the reference clock time recovered by the first network device responsively to the control signal; and distribute the adjusted clock time to the first network device, using a clock signal via the at least one clock connection;
   the root network device includes a clock output port to output the clock signal indicative of the clock time output by the second physical hardware clock via the at least one clock connection;
   the first network device includes a clock input port to receive the clock signal via the at least one clock connection;
   the first network device is configured to discipline the first physical hardware clock responsively to the received clock signal; and
   the root network device is configured to adjust the clock time or a clock frequency output by the second physical hardware clock so as to iteratively reduce an absolute value of the clock differential between the clock time output by the first physical hardware clock and the recovered reference clock time.

2. The system according to claim 1, wherein the root network device is configured to adjust the clock frequency of the second physical hardware clock responsively to the control signal.

3. The system according to claim 1, wherein the reference clock time is in Coordinated Universal Time (UTC) format.

4. The system according to claim 1, wherein the first network device includes a network interface to receive packets over a network from the remote clock, which outputs the reference clock time.

5. The system according to claim 4, wherein the first network device is configured to recover the reference clock time from the packets according to Precision Time Protocol (PTP).

6. The system according to claim 1, further comprising a third network device, and wherein:
   the root network device, the first network device, and the third network device are connected in a daisy chain formation;
   the root network device includes a clock output port to output a first clock signal indicative of the clock time output by the second physical hardware clock via a first clock connection to the first network device;
   the first network device includes a clock input port to receive the first clock signal via the first clock connection;
   the first network device is configured to discipline the first physical hardware clock responsively to the received first clock signal;
   the first network device includes a clock output port to output a second clock signal indicative of a clock time output by the first physical hardware clock via a second clock connection to the third network device;
   the third network device includes a clock input port to receive the second clock signal via the second clock connection;
   the third network device includes a third physical hardware clock; and
   the third network device is configured to discipline the third physical hardware clock responsively to the received second clock signal.

7. The system according to claim 1, wherein the clock signal is an analog signal and the control signal is a digital signal.

8. The system according to claim 1, wherein the root network device is configured to output the clock signal via the at least one clock connection using a pulsed signal.

9. The system according to claim 1, further comprising a third network device, and wherein:
   the root network device includes a clock output port to output the clock signal indicative of the clock time output by the second physical hardware clock via a first clock connection and a second clock connection to the first network device and the third network device, respectively;

the first network device includes a clock input port to receive the clock signal via the first clock connection; and the third network device includes a clock input port to receive the clock signal via the second clock connection.

10. The system according to claim 9, wherein:

the first network device is configured to discipline the first physical hardware clock responsively to the received clock signal;

the third network device includes a third physical hardware clock; and the third network device is configured to discipline the third physical hardware clock responsively to the received clock signal.

11. The system according to claim 9, wherein any one of the first network device, root network device, and third network device are configured to selectively connect to the remote clock and to recover the reference clock time from packets received from the remote clock.

12. The system according to claim 1, wherein the first network device includes at least one of the following: a data processing unit (DPU), a central processing unit (CPU), a switch, and a network interface controller.

13. A synchronized communication method, comprising:

in a first network device:

recovering a reference clock time from packets received from a remote clock;

finding a clock differential between a clock time output by a first physical hardware clock of the first network device and the recovered reference clock time; and providing a control signal to a root network device responsively to the clock differential;

in the root network device:

adjusting a clock time output by a second physical hardware clock of the root network device yielding an adjusted clock time equal to the reference clock time recovered by the first network device responsively to the control signal;

distributing the adjusted clock time to the first network device, using a clock signal via at least one clock connection; and outputting using a clock output port of the root network device the clock signal indicative of the clock time output by the second physical hardware clock via the at least one clock connection;

in the first network device:

receiving using a clock input port of the first network device the clock signal via the at least one clock connection; and disciplining the first physical hardware clock responsively to the received clock signal; and in the root network device, adjusting the clock time or a clock frequency output by the second physical hardware clock so as to iteratively reduce an absolute value of the clock differential between the clock time output by the first physical hardware clock and the recovered reference clock time.

14. The method according to claim 13, further comprising, adjusting the clock frequency of the second physical hardware clock responsively to the control signal.

15. The method according to claim 13, wherein the recovering includes recovering the reference clock time from the packets according to Precision Time Protocol (PTP).

* * * * *